United States Patent
Amstibovitsky

(10) Patent No.: US 8,826,786 B2
(45) Date of Patent: Sep. 9, 2014

(54) CUTTING TOOL WITH INTERNAL FLUID DELIVERY SYSTEM

(75) Inventor: Leonid Amstibovitsky, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 287 days.

(21) Appl. No.: 13/555,726

(22) Filed: Jul. 23, 2012

(65) Prior Publication Data

US 2013/0220089 A1 Aug. 29, 2013

Related U.S. Application Data

(60) Provisional application No. 61/602,437, filed on Feb. 23, 2012.

(51) Int. Cl.
*B23Q 11/10* (2006.01)

(52) U.S. Cl.
USPC ........................ 83/22; 83/169; 82/50; 407/11

(58) Field of Classification Search
USPC ............... 83/13, 22, 169; 82/50, 901; 407/11, 407/113–120
See application file for complete search history.

(56) References Cited

U.S. PATENT DOCUMENTS

| | | | | |
|---|---|---|---|---|
| 4,848,198 A * | 7/1989 | Royal et al. | ..................... | 82/1.11 |
| 5,340,242 A | 8/1994 | Armbrust et al. | | |
| 5,697,739 A * | 12/1997 | Lewis et al. | ..................... | 409/230 |
| 5,839,335 A * | 11/1998 | Tilley | .............................. | 83/169 |
| 5,848,862 A * | 12/1998 | Antoun | ......................... | 408/199 |
| 6,045,300 A * | 4/2000 | Antoun | ............................ | 407/11 |
| 6,126,365 A * | 10/2000 | Okawa et al. | .................. | 407/66 |
| 6,299,388 B1 * | 10/2001 | Slabe | .............................. | 407/11 |
| 6,637,984 B2 * | 10/2003 | Murakawa et al. | ............. | 407/11 |
| 6,658,974 B2 * | 12/2003 | Momosaki | ....................... | 83/169 |
| 7,371,032 B2 * | 5/2008 | Jansson | ............................ | 407/11 |
| 8,328,477 B2 * | 12/2012 | Allen et al. | .................... | 408/213 |
| 8,465,232 B2 * | 6/2013 | Amstibovitsky et al. | ....... | 407/11 |
| 8,556,550 B2 * | 10/2013 | Lutz et al. | ....................... | 408/56 |
| 2002/0189413 A1 * | 12/2002 | Zurecki et al. | ................. | 82/1.11 |
| 2003/0019333 A1 * | 1/2003 | Scott | ............................ | 76/108.2 |
| 2005/0011201 A1 * | 1/2005 | Zurecki et al. | .................... | 62/64 |
| 2005/0023042 A1 * | 2/2005 | Yong et al. | .................... | 175/372 |
| 2005/0025594 A1 * | 2/2005 | Lindblom | ..................... | 408/227 |
| 2006/0140728 A1 | 6/2006 | Giannetti | | |
| 2011/0305531 A1 * | 12/2011 | Amstibovitsky et al. | ....... | 407/11 |
| 2011/0311324 A1 * | 12/2011 | Prichard et al. | .................. | 407/11 |
| 2012/0230780 A1 * | 9/2012 | Henry et al. | .................... | 407/11 |
| 2013/0051934 A1 * | 2/2013 | Henry et al. | .................... | 407/11 |
| 2013/0078043 A1 * | 3/2013 | Henry et al. | .................... | 407/11 |
| 2014/0064862 A1 * | 3/2014 | Breisch | ........................... | 407/11 |

FOREIGN PATENT DOCUMENTS

EP 0599393 6/1994

OTHER PUBLICATIONS

International Search Report dated Jun. 21, 2013 issued in PCT counterpart application (No. PCT/IL2013/050221).

* cited by examiner

*Primary Examiner* — Sean Michalski
(74) *Attorney, Agent, or Firm* — Womble Carlyle

(57) ABSTRACT

A cutting tool has an internal cutting tool fluid delivery system. The cutting tool has a tool body and a fluid delivery head coupled thereto by a solid coupling member with a continuous male thread. The tool body includes a body coupling bore and the head includes a head coupling bore which communicates with the body coupling bore. At least one of the body and head coupling bores includes a circumferentially interrupted female thread which has a longitudinal thread axis and a radial outer thread boundary. The or each coupling bore having the female thread includes a thread passage which extends along the thread axis. In an axial cross section of the female thread, the thread passage extends both inside and outside the radial outer thread boundary.

21 Claims, 3 Drawing Sheets

CUTTING TOOL WITH INTERNAL FLUID DELIVERY SYSTEM

RELATED APPLICATIONS

The present application claims priority to U.S. Provisional Patent Application No. 61/602,437, filed Feb. 23, 2012, the contents of which are incorporated by reference in their entirety.

FIELD OF THE INVENTION

The subject matter of the present application relates to cutting tools having built-in fluid delivery systems.

BACKGROUND OF THE INVENTION

Cutting tools of the field are known and disclosed, for example, in U.S. Pat. No. 5,340,242, which discloses a cutting tool delivery system which utilizes a hollow screw for clamping and delivering fluid internally.

SUMMARY OF THE INVENTION

The subject matter of the present application relates to a cutting tool having an internal cutting tool fluid delivery system. The cutting tool includes a tool body to which a fluid delivery head is coupled by a solid coupling member which has a continuous male thread. At least one of the tool body and the fluid delivery head has a coupling bore provided with a circumferentially interrupted female thread which has a thread axis and is designed to engage the male thread. The or each coupling bore provided with the female thread is in communication with a thread passage which extends along the thread axis and interrupts the female thread in the circumferential direction. In the radial direction relative to the bore axis, the thread passage extends both inside and outside a radial outer boundary of the female thread. A possible advantage of such a delivery mechanism is that it is compact and therefore allows integrating such a system in very small cutting tools.

In accordance with the subject matter of the present application there is provided a cutting tool having an internal fluid delivery system. The cutting tool comprises a tool body and a fluid delivery head coupled thereto by a solid coupling member which has a continuous male thread;
the tool body comprises a body coupling bore;
the fluid delivery head comprises a head coupling bore which communicates with the body bore;
at least one of the body coupling bore and head coupling bore comprises a circumferentially interrupted female thread with a longitudinal thread axis and a radial outer thread boundary,
wherein
the female thread comprises a thread passage which extends along the thread axis and is configured only to convey fluid, and
in an axial cross section of the female thread, the thread passage extends both inside and outside the radial outer thread boundary.

Any of the following features, either alone or in combination, may be applicable to any of the above aspects of the subject matter of the application:

In an axial cross section of the female thread, the outer thread boundary can lie in a circle defined by an outer thread diameter about the thread axis.

The female thread can have a cylindrical shape.

The thread passage can be a groove.

The thread passage can extend along the entire length of the female thread.

Optionally, only the body bore comprises the female thread.

The head and the body respectively comprise head and body passages, each of which communicates with the thread passage.

The coupling member can include a coupling head peripheral surface which seals a portion of the head passage.

Adjacent the body bore, the body comprises a cutting portion which comprises a pocket and a cutting insert releasably secured therein.

The coupling member can be a screw, which passes through the head bore and is screw-threaded into the female thread.

The tool body can comprise a washer which includes an inner washer diameter which is greater than a limit diameter which is defined by a radially outer-most portion of the thread passage at an outer bore end.

BRIEF DESCRIPTION OF THE DRAWINGS

For a better understanding of the subject matter of the present application and to show how the same may be carried out in practice, reference will now be made to the accompanying drawings, in which.

Figure 1:
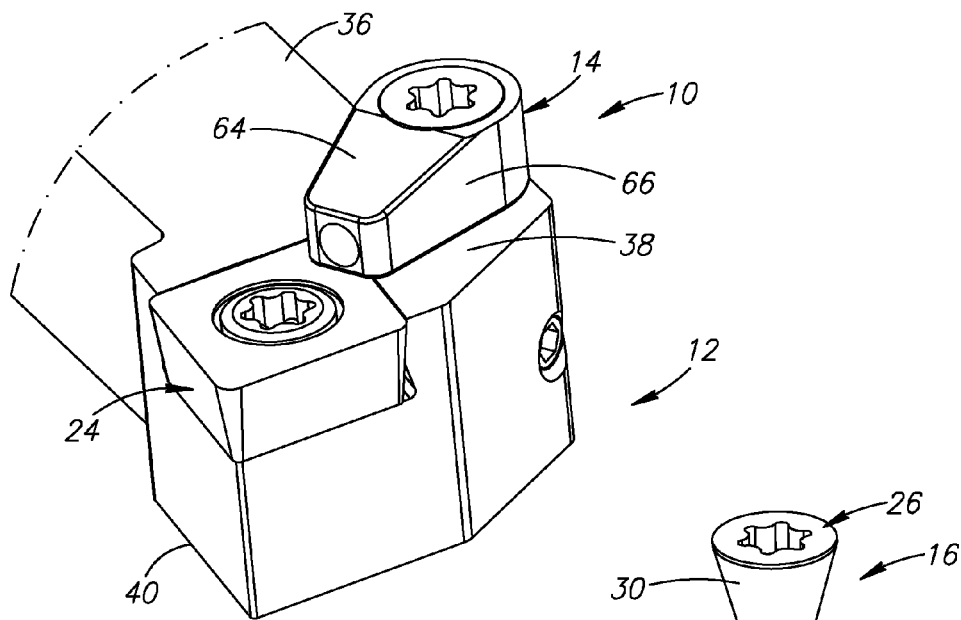
FIG. 1 is an isometric view of a cutting tool.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
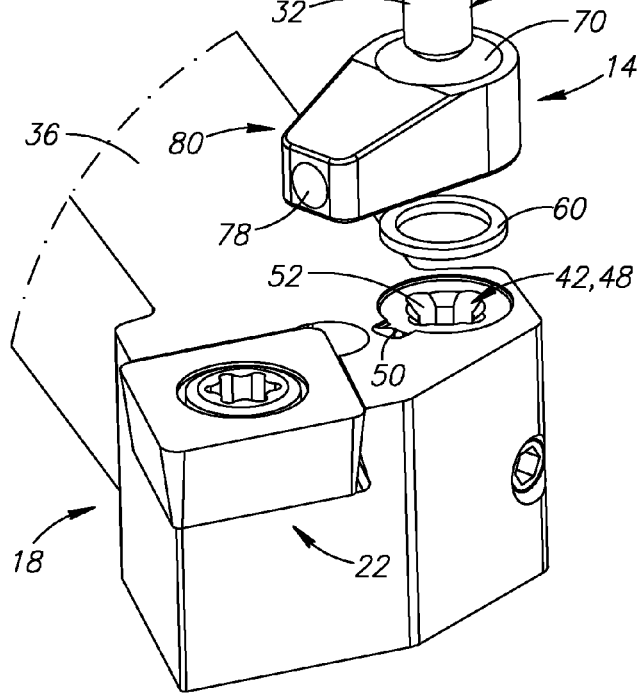
FIG. 2 is an isometric exploded view of the cutting tool of FIG. 1.
Figure 3:
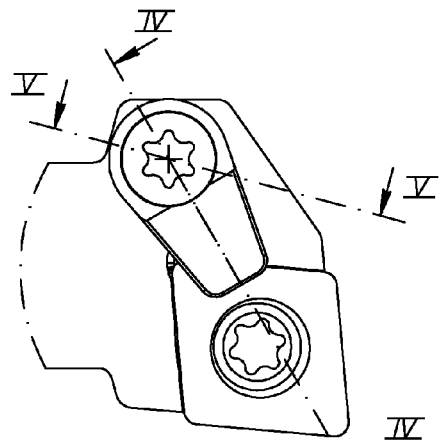
FIG. 3 is a plan view of the cutting tool of FIG. 1.

Reference is made to FIGS. 1 and 2. A cutting tool 10 includes a tool body 12 and a fluid delivery head 14 mounted thereto by a threaded coupling member 16. The cutting tool 10 can be a compact cutting tool 10 which includes an internal fluid delivery system 13. The fluid delivery system 13 can be used to deliver cooling fluid at pressures as high as 300 Bar.

The cutting tool 10 includes a cutting portion 18 which can be located at a body front end 20. The cutting portion 18 can include a pocket 22 and a cutting insert 24 releasably secured therein. The cutting insert 24 can be secured in the pocket 22 via a screw, which can differ from the coupling member 16.

The coupling member 16 can include a coupling head 26 and a coupling body 28 which extends therefrom. The coupling head 26 has a coupling head peripheral surface 30 which can have a conical shape. The coupling body 28 includes a continuous male thread 32. The male thread 32 can have a generally cylindrical shape, and inner and outer male thread diameters M1, M2. The coupling member 16 can include a narrow portion 34, which is located axially between the coupling head 26 and coupling body 28. Aside from the continuous male thread 32, the coupling member 16 is solid, or has a solid construction. The word solid is used in the sense that the coupling member 16 is devoid of cavities, apertures or grooves. Specifically, the male thread 32 is devoid of any longitudinal grooves or holes. The coupling member 16 is therefore not configured to, and cannot, convey fluid internally. According to the present example, the coupling member 16 is a screw.

The tool body 12 can be elongated, and it can have a longitudinal body axis A. The tool body 12 can include a body peripheral surface 36 which extends rearwardly from the body front end 20. The body peripheral surface 36 can have a generally rectangular axial cross section and body top and bottom surfaces 38, 40. According to the present example, the tool body 12 can include a blind body coupling bore 42 and a body fluid passage 44. The body coupling bore 42 has inner and outer body bore ends 46, 48. The body coupling bore 42 can open out to the body peripheral surface 36 at the outer body bore end 48, and can communicate with the body fluid passage 44 at the inner body bore end 46. The body fluid passage 44 can extend rearwardly from the inner body bore end 46 along the body axis A. The tool body 12 can include a blind locating bore 50 which can open out to the body peripheral surface 36 adjacent the body coupling bore 42.

In the figures, the body coupling bore 42 and the cutting portion 18 are integrally formed together in a tool body 12 having unitary one-piece construction, with the body coupling bore 42 located adjacent to the cutting portion 18. It is also possible in other embodiments for the tool body to have the body coupling bore 42 and the cutting portion 18 formed on separate pieces which are then brought together so that, again, the body coupling bore 42 is located adjacent to the cutting portion 18.

Figure 7:
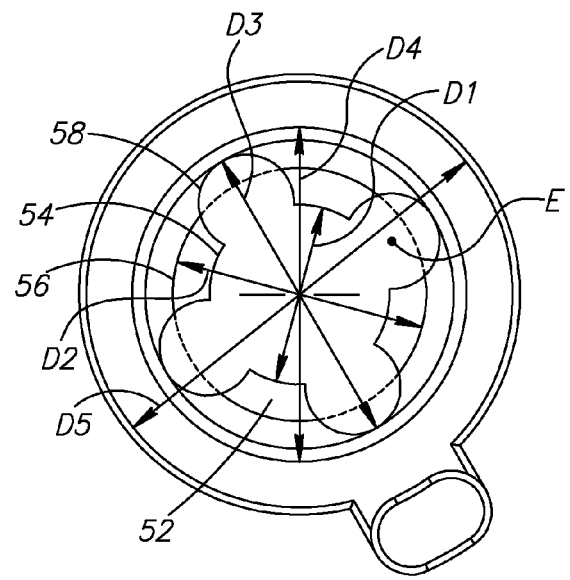
FIG. 7 is a detail view of the cutting tool indicted by line VII in FIG. 6.
Figure 8:
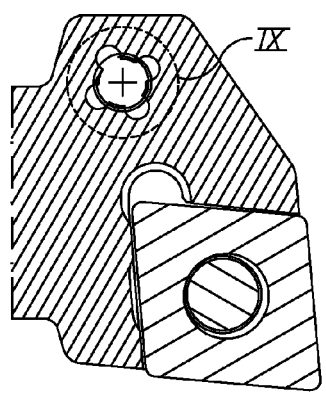
FIG. 8 is a cross sectional view taken along line VIII-VIII of FIG. 4.

The body coupling bore 42 has a longitudinal body bore axis B. According to the present example, the body coupling bore 42 includes a female thread 52 which is configured to threadingly engage the male thread 32 of the coupling member 16. The female thread 52 has a thread axis C and inner and outer female thread diameters D1, D2 (as shown in FIG. 7). The thread and body bore axes C, B can be coaxial. In each cross section of the female thread 52 along the thread axis C, the inner and outer female thread diameters D1, D2 can define radial inner and outer thread boundaries 54, 56 of the female thread 52. When proceeding along the thread axis C, the inner and outer female thread diameters D1, D2 can be constant. In other words, the female thread 52, and therefore the inner and outer thread boundaries 54, 56, can have a generally circular cylindrical shape.

Figure 4:
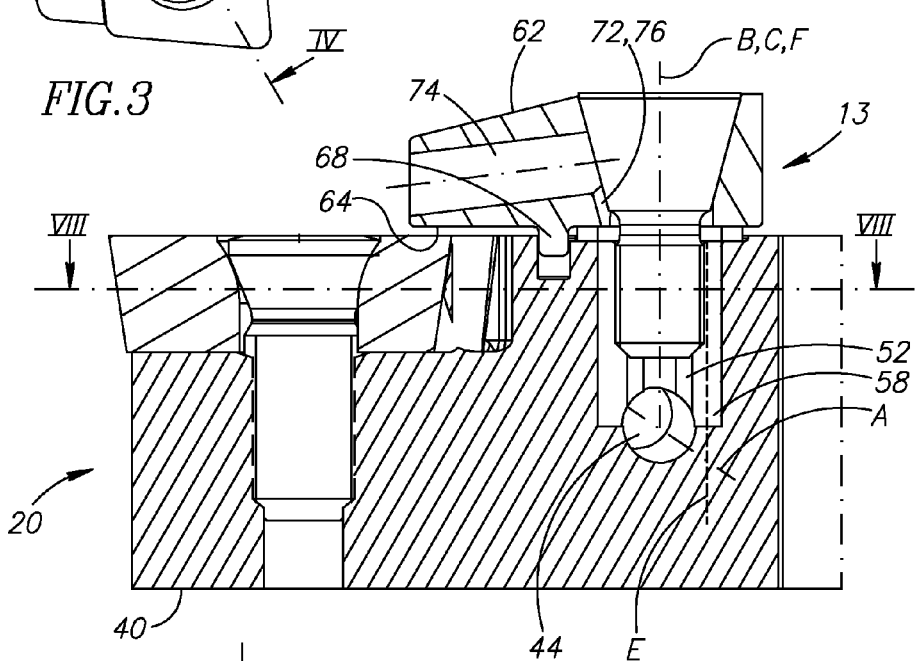
FIG. 4 is a cross sectional view taken along line IV-IV of FIG. 3, which passes through thread passages of the cutting tool.
Figure 5:
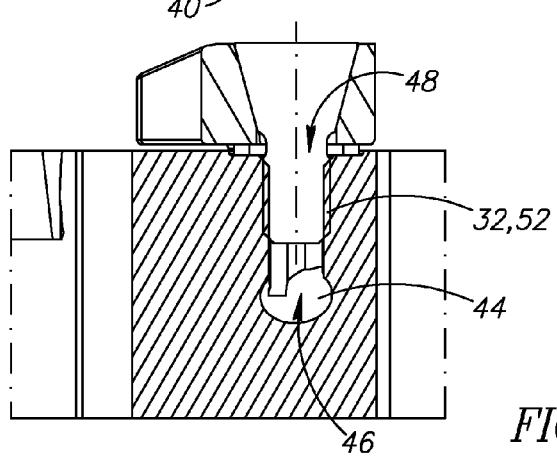
FIG. 5 is a cross sectional view taken along line V-V of FIG. 3 which passes through a female thread of the cutting tool.
Figure 6:
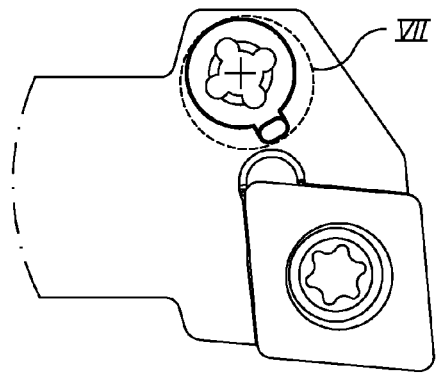
FIG. 6 is a top plan view of the cutting tool of FIG. 1 with a head and coupling member removed.
Figure 9:
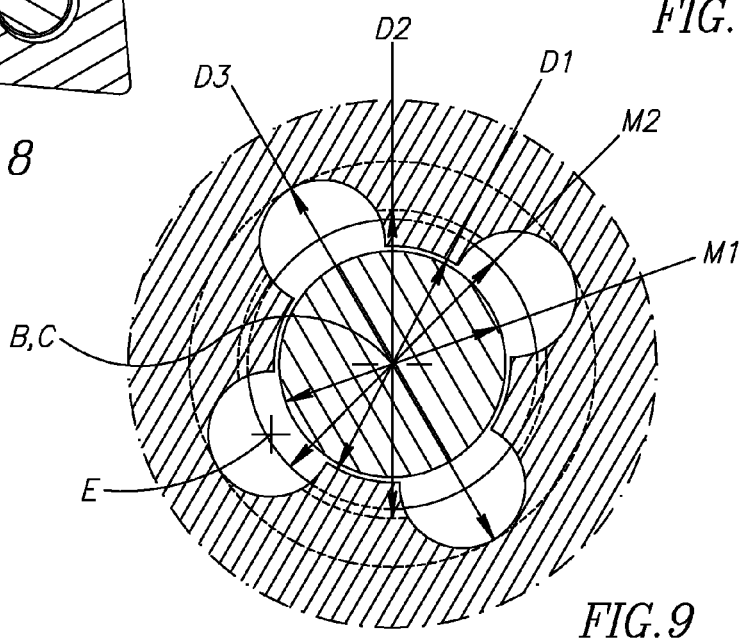
FIG. 9 is a detail view of the cutting tool indicted by line IX in FIG. 8.

Attention is drawn to FIGS. 4, 7 and 9. According to the present example, the body coupling bore 42 which has the female thread 52 includes four thread passages 58, each of which has a longitudinal passage axis E. The longitudinal passage axis E can be generally parallel to thread axis C, though this is not a firm requirement. Also, the number of thread passages 58 is not limited to four. The thread passages 58 can be formed as longitudinal grooves in the tool body 12 which interrupt the female thread 52. Thus, the body coupling bore 42 comprising the female thread 52 is in communication with the thread passages 58 which extend along the thread axis C and interrupt the female thread 52 as the latter winds in the circumferential direction. This results in the body coupling bore 42 having a circumferentially interrupted female thread 52.

Each thread passage 58 can open out to the body peripheral surface 36 at the outer body bore end 48, and extend inwardly therefrom, along the thread axis C. Each thread passage 58 can extend along the entire length of the body coupling bore 42. Each thread passage 58 can extend along the entire length of the female thread 52. At the inner body bore end 46, each thread passage 58 can communicate with the body fluid passage 44.

In a radial direction, perpendicular to the thread axis C, each thread passage 58 is formed partially in the female thread 52, and partially in the tool body 12, outside of the female thread 52. In other words, in any axial cross sectional view of the female thread 52 along the thread axis C, each thread passage 58 is formed both inwards and outwards of the outer thread boundary 56. In any axial cross sectional view, an outer most point of any of the thread passages 58 defines a limit diameter D3 perpendicular to the thread axis C. The limit diameter D3 is greater than the outer female thread diameter D2. According to the present example, in each cross sectional view of the female thread 52 along the thread axis C, each thread passage 58 can be formed between a circle defined by the inner female thread diameter D1 and a circle defined by the limit diameter D3. In an axial view along each passage axis E, each thread passage 58 can have a concavely curved cross section.

In accordance with the present example, at the outer body bore end 48, the cutting tool 10 can include a washer 60. The washer 60 has inner and outer washer diameters D4, D5. The inner washer diameter D4 can be equal to, or greater than, the limit diameter D3. In an assembled position, when the fluid delivery head 14 is mounted on the tool body 12, the washer 60 can function as a seal, which prevents fluid from leaking out between the tool body 12 and the fluid delivery head 14. In the case of thread passages 58 which are unevenly circumferentially distributed around the body coupling bore 42, or in the case of an odd number of thread passages 58, the limit diameter D3 may more appropriately be established with reference to a limit radius R3, due to the absence of diametrically opposite thread passages 58.

According to the present application, the fluid delivery head 14 includes opposing head top and bottom surfaces 62, 64 and a head peripheral surface 66 which extends therebetween. The fluid delivery head 14 can include a locating pin 68 which extends from the head bottom surface 64. The fluid delivery head 14 can include a through head coupling bore 70 which has a head bore axis F and can open out to the head top and bottom surfaces 62, 64. The fluid delivery head 14 includes a fluid conveying head passage 72. The head passage 72 can include a first passage portion 74 which can open out to the head peripheral surface 66 at a discharge opening 78, at a head front end 80. The head passage 72 can include a second passage portion 76, which opens out to the head bottom surface 64 and can be formed as an integral part of the head coupling bore 70. Stated differently, in this non-limiting example, the head passage 72 can include a longitudinal groove formed along the head bore axis F in the head coupling bore 70, which can open out inwards.

According to the present application, the coupling head peripheral surface 30 forms a part of the head passage 72. In other words, a portion of the coupling head peripheral surface 30 seals, or completes, an intersection between the first and second passage portions 74, 76 of the head passage 72. The coupling head 26 has a dual function, in the sense that it seals the intersection in the head passage 72 and also couples the fluid delivery head 14 to the tool body 12. The unification of functions is intended to help make the fluid delivery head 14, and consequently the cutting tool 10, as small as possible.

According to the present application, in the assembled position, the fluid delivery head 14 is coupled to the tool body 12, such that the head coupling bore 70 can communicate with the body coupling bore 42 and the thread passages 58 can communicate with the head passage 72. The head bottom surface 64 can abut the body peripheral surface 36, such as at the head top surface 38. The coupling member 16 is located in the head coupling bore 70 and threadingly engaged to the female thread 52 in the body coupling bore 42. The locating pin 68 is located in the locating bore 50.

Attention is drawn to FIGS. 4 and 9. When the cutting tool 10 is in the assembled position and is operative, i.e. machines a workpiece, fluid (e.g. coolant) is pumped through the body fluid passage 44 towards the body coupling bore 42. The fluid then splits into multiple fluid paths, each of which passes through one of the thread passages 58, between the outer male thread diameter M2 and the limit diameter D3. Thus, fluid in each of the multiple fluid paths travels past the coupling member's male thread 32 rather than passing through the coupling member 16. The fluid then passes, through the washer 60, to the second passage portion 76 in the head coupling bore 70. In this example, the multiple fluid paths exit the four thread passages 58 and reunite between the inner washer diameter D4 and the narrow portion 34 of the coupling member 16. In the head coupling bore 70, the fluid then passes through the second passage portion 76 alongside the coupling member 16. The fluid is then directed to the first passage portion 74, at least partially by the coupling head peripheral surface 30, and passes further through the first passage portion 74 which opens out to the discharge opening 78. The fluid is thus directed towards the adjacent cutting portion 18 where, during cutting operations, the fluid stream will hit and help break off chips that are being formed.

A maximum height of the tool can be measured between the body bottom surface 40 and an upper-most portion of the fluid delivery head 14 or the coupling head 26. In some cutting machines, there is a height limitation. One example, where minimal size is advantageous, is when cutting tools are stacked one on top of the other, in a machine turret. In such cases, a maximum height of the cutting tool is often defined, such that cutting tools with conventional fluid delivery systems simply can't fit in the turret.

A possible advantage of the present fluid delivery system is that it is integrated into the body and head coupling bores 42, 70, and therefore takes up very little space in the cutting tool 10 relative to other internal fluid delivery systems. In other words, a thread passage 58 which is integrated into the female thread 52 helps reduce the overall size of the cutting tool 10. This is achieved due to the fact that fluid is delivered roughly in the same location as, or integrated into, the coupling mechanism. The overall axial cross section area of the cutting tool 10 is therefore minimized, when compared, e.g., to an external fluid delivery system, or to an internal fluid delivery system, in which the fluid passages are separate from the female thread 52. Consequently, smaller cutting tools with internal fluid delivery systems can be produced. For example, if the female thread 52 and the fluid passage are spaced apart from each other, a stronger, and therefore bigger, screw is required in order to couple the fluid delivery head 14 onto the tool body 12. It should be mentioned that, for example, in order to achieve a well-sealed passage at high pressure, the coupling forces must be respectively larger.

As previously mentioned, the screw couples the fluid delivery head 14 to the tool body 12, and at the same time, functions as part of the fluid delivery system, by sealing a portion of the head passage 72. It is therefore important that, within the size limitations of the cutting tool, a screw with the strongest possible structure is chosen.

A possible advantage of the location of the thread passages 58 (i.e., located only partially in the female thread 52) is that the coupling member 16 can remain solid, or otherwise unaltered. For example, screws which are used for delivering fluid can be hollow, and have a core passage and radial holes which connect with the core passage. In these cases, the radial holes may require an expensive, specifically designed orientation of thread, in order to align the radial holes with a respective passage in the receiving female counterpart upon tightening of the screw. In other cases, the male thread 32 of the screw may include external grooves. In any case, screws with external grooves and/or axial or radial holes are considerably weaker relative to unaltered screws of the same kind. Consequently, compromises must be made, such as delivering fluid at lower pressure (due to weaker coupling/sealing forces applied by a weaker screw) or choosing larger screws, therefore compromising on the size.

Another possible advantage of the location of the thread passage 58 is the ease of production. In order to produce the thread passage 58 it is only necessary to machine a simple groove in the female thread 52.

According to the present application, the thread passages 58 can be distributed about the thread axis C, in order to take up as little room as possible in the cutting tool 10. The thread passages can be evenly distributed 58 about the thread axis C.

The description above includes exemplary embodiments and details for enablement, if needed, of claimed subject matter, and does not exclude non-exemplified embodiments and details from the claim scope of the present application.

What is claimed is:

1. A cutting tool (10) having a fluid delivery system (13), comprising a tool body (12) and a fluid delivery head (14) coupled thereto by a solid coupling member (16) having a continuous male thread (32), the tool body (12) comprising a body coupling bore (42), the fluid delivery head (14) comprising a head coupling bore (70) communicating with the body coupling bore (42), at least one of the body coupling bore (42) and head coupling bore (70) comprising a circumferentially interrupted female thread (52) having a longitudinal thread axis (C) and a radial outer thread boundary (56), wherein the or each coupling bore comprising a female thread (52) is in communication with a thread passage (58) which extends along the thread axis (C) and interrupts the female thread (52) in the circumferential direction, and in an axial cross section of the female thread (52), the thread passage (58) extends both inside and outside the radial outer thread boundary (56).

2. The cutting tool (10) according to claim 1, wherein in an axial cross section of the female thread (52), the outer thread boundary (56) lies in a circle defined by an outer thread diameter (D2) about the thread axis (C).

3. The cutting tool (10) according to claim 1, wherein the female thread (52) has a circular cylindrical shape.

4. The cutting tool (10) according to claim 1, wherein the thread passage (58) is a groove.

5. The cutting tool (10) according to claim 1, wherein the thread passage (58) extends along the entire length of the female thread (52).

6. The cutting tool (10) according to claim 1, wherein only the body coupling bore (42) comprises the female thread.

7. The cutting tool (10) according to claim 1, wherein the fluid delivery head (14) and the tool body (12) respectively comprise head and body fluid passages (72, 44), each of which communicates with the thread passage (58).

8. The cutting tool (10) according to claim 7, wherein the coupling member (16) comprises a coupling head peripheral surface (30) which seals a portion of the head passage (72).

9. The cutting tool (10) according to claim 1, wherein, adjacent the body coupling bore (42), the tool body (12) comprises a cutting portion (18) which comprises a pocket (22) and a cutting insert (24) releasably secured therein.

10. The cutting tool (10) according to claim 9, wherein the coupling member (16) is a screw, which passes through the head coupling bore (70) and is screw-threaded into the female thread (52).

11. The cutting tool (10) according to claim 1, wherein the tool body (12) comprises a washer (60) having an inner washer diameter (D4) which is greater than a limit diameter (D3) defined by a radially outer-most portion of the thread passage (58) at an outer bore end (48).

12. A cutting tool (10) comprising:
a tool body (12) comprising a body coupling bore (42) having a bore axis (B);
a circumferentially interrupted female thread (52) formed in the body coupling bore (43), the female thread having a longitudinal thread axis (C) and a radial outer thread boundary (56);
at least one thread passage (58) formed in the tool body (12) and extending along the thread axis (C), the at least one thread passage (58) in communication with the body coupling bore (42) and interrupting the female thread in the circumferential direction; and
a body passage (44) formed in the tool body (12) and in fluid communication with the at least one thread passage (58).

13. The cutting tool (10) according to claim 12, wherein:
in an axial cross section of the female thread (52), the at least one thread passage (58) extends both inside and outside the radial outer thread boundary (56).

14. The cutting tool (10) according to claim 12, wherein: the thread passage (58) extends along the entire length of the female thread (52).

15. The cutting tool (10) according to claim 12, further comprising:
a fluid delivery head (14) comprising a head coupling bore (70); and
a coupling member (16) having a continuous male thread (32); wherein:
the fluid delivery head (14) is coupled to the tool body (12) by the coupling member;
the head coupling bore (70) communicates with the body coupling bore (42); and
the body passage (44) is in fluid communication with the fluid delivery head (14) via the at least one thread passage (58).

16. The cutting tool (10) according to claim 15, wherein:
the fluid delivery head (14) comprises a head fluid passage (72) which communicates with the thread passage (58); and
the coupling member (16) comprises a coupling head peripheral surface (30) which seals a portion of the head passage (72).

17. The cutting tool (10) according to claim 15, wherein:
the coupling member (16) is a screw, which passes through the head coupling bore (70) and is screw-threaded into the female thread (52).

18. The cutting tool (10) according to claim 15, further comprising:
a washer (60) interposed between the tool body (12) at an outer bore end (48) of the body coupling bore (42), and the fluid delivery head (14); wherein:
the washer has an inner washer diameter (D4) which is greater than a limit diameter (D3) defined by a radially outer-most portion of the thread passage (58) at the outer bore end (48).

19. A cutting tool (10) comprising:
a tool body (12) comprising a body coupling bore (42) having a bore axis (B);
a fluid delivery head (14) coupled to the tool body (12) by a coupling member (16) having a continuous male thread (32), the head coupling bore (70) communicating with the body coupling bore (42);
a circumferentially interrupted female thread (52) formed in the head coupling bore (70), the female thread having a longitudinal thread axis (C) and a radial outer thread boundary (56);
at least one thread passage (58) formed in the fluid delivery head (14) and extending along the thread axis (C), the at least one thread passage (58) in communication with the head coupling bore (70) and interrupting the female thread (52) in the circumferential direction; and
a body passage (44) formed in the tool body (12) and in fluid communication with the fluid delivery head (14) via the at least one thread passage (58).

20. The cutting tool (10) according to claim 19, wherein:
in an axial cross section of the female thread (52), the at least one thread passage (58) extends both inside and outside the radial outer thread boundary (56).

21. A method of supplying coolant fluid in a cutting tool (10) comprising:
a tool body (12) comprising a cutting portion (18) and a body coupling bore (42) having a bore axis (B);
a fluid delivery head (14) coupled to the tool body (12) by a coupling member (16), the head coupling bore (70) communicating with the body coupling bore (42); and
a body passage (44) formed in the tool body (12) and in fluid communication with the body coupling bore (42);
the method comprising:
pumping coolant through the body fluid passage (44) into the body coupling bore (42);
splitting the coolant into multiple fluid paths, each of which travels past the coupling member (16) and none of which travel through the coupling member (16);
reuniting the multiple fluid paths in the fluid delivery head (14); and
after reuniting the multiple fluid paths, directing the coolant in the direction of the cutting portion (18).

* * * * *